US006818030B2

United States Patent
Feng et al.

(10) Patent No.: US 6,818,030 B2
(45) Date of Patent: Nov. 16, 2004

(54) PROCESS FOR PRODUCING ABRASIVE PARTICLES AND ABRASIVE PARTICLES PRODUCED BY THE PROCESS

(75) Inventors: Xiangdong Feng, Broadview Heights, OH (US); Yie-Shein Her, Canandaigua, NY (US)

(73) Assignee: Ferro Corporation, Cleveland, OH (US)

( * ) Notice: Subject to any disclaimer, the term of this patent is extended or adjusted under 35 U.S.C. 154(b) by 59 days.

(21) Appl. No.: 10/255,136

(22) Filed: Sep. 25, 2002

(65) Prior Publication Data
US 2003/0093957 A1 May 22, 2003

Related U.S. Application Data

(63) Continuation-in-part of application No. 09/992,485, filed on Nov. 16, 2001, now Pat. No. 6,596,042.

(51) Int. Cl.$^7$ ............................. C09K 3/14; C09G 1/02; C09G 1/04
(52) U.S. Cl. ............................. 51/307; 51/309; 106/3; 423/263; 438/692; 438/693
(58) Field of Search .................... 51/307, 309; 106/3; 438/692, 693; 423/263; 501/152; 216/89; 252/79.1

(56) References Cited

U.S. PATENT DOCUMENTS

| | | | |
|---|---|---|---|
| 3,429,080 A | 2/1969 | Lachapelle | 51/309 |
| 4,601,755 A | 7/1986 | Melard et al. | 106/3 |
| 4,786,325 A | 11/1988 | Melard et al. | 106/3 |
| 5,002,747 A | 3/1991 | Le Loarer | 423/592 |
| 5,011,671 A | 4/1991 | Le Loarer | 423/592 |
| 5,279,789 A | 1/1994 | Le Loarer et al. | 423/21.1 |
| 5,389,352 A | 2/1995 | Wang | 423/263 |
| 5,759,917 A | 6/1998 | Grover et al. | 438/690 |
| 5,891,412 A | 4/1999 | Le Loarer et al. | 423/263 |
| 5,897,675 A | 4/1999 | Mangold et al. | 51/309 |
| 5,962,343 A | 10/1999 | Kasai et al. | 438/693 |
| 6,120,571 A | 9/2000 | Aihara et al. | 51/309 |
| 6,221,118 B1 | 4/2001 | Yoshida et al. | 51/309 |
| 6,596,042 B1 * | 7/2003 | Feng et al. | 51/309 |

FOREIGN PATENT DOCUMENTS

EP    0875547 A2    11/1998

OTHER PUBLICATIONS

Lakhwani et al., "Hydrothermal coarsening of CeO2 particles," 1999 Materials Research Society, J. Mater. Res., vol. 14, No. 4, Apr. 1999, pp. 1455–1461.

* cited by examiner

Primary Examiner—Michael Marcheschi
(74) Attorney, Agent, or Firm—Rankin, Hill, Porter & Clark LLP

(57) ABSTRACT

The present invention provides a process for producing particles suitable for use as abrasives in chemical-mechanical polishing slurries. The process according to the invention includes mixing at least one crystallization promoter such as $Ti[OCH(CH_3)_2]_4$ with at least one cerium compound and at least one solvent, and subjecting said mixture to hydrothermal treatment at a temperature of from about 60° C. to about 700° C. to produce the particles. Particles formed in accordance with the present invention exhibit a large crystallite size, and can be used to polish silicon-containing substrates to a high degree of planarity at a relatively high rate.

27 Claims, 1 Drawing Sheet

PROCESS FOR PRODUCING ABRASIVE PARTICLES AND ABRASIVE PARTICLES PRODUCED BY THE PROCESS

CROSS-REFERENCE TO RELATED APPLICATION

This application is a continuation-in-part of application Ser. No. 09/992,485 filed Nov. 16, 2001, U.S. Pat. No. 6,596,042.

FIELD OF INVENTION

The present invention provides a process for producing abrasive particles and abrasive particles produced according to the process.

BACKGROUND OF THE INVENTION

Chemical-mechanical polishing (CMP) slurries are used, for example, to planarize surfaces during the fabrication of semiconductor chips and the like. CMP slurries typically include reactive chemical agents and abrasive particles dispersed in a liquid carrier. The abrasive particles perform a grinding function when pressed against the surface being polished using a polishing pad.

It is well known that the size, composition, and morphology of the abrasive particles used in a CMP slurry can have a profound effect on the polishing rate. Over the years, CMP slurries have been formulated using abrasive particles formed of, for example, alumina ($Al_2O_3$), ceric oxide ($CeO_2$), iron oxide ($Fe_2O_3$), silica ($SiO_2$), silicon carbide (SiC), silicon nitride ($Si_3N_4$), tin oxide ($SnO_2$), titania ($TiO_2$), titanium carbide (TiC), tungstic oxide ($WO_3$), yttria ($Y_2O_3$), zirconia ($ZrO_2$), and combinations thereof. Of these oxides, ceric oxide ($CeO_2$) is the most efficient abrasive in CMP slurries for planarizing silicon dioxide insulating layers in semiconductors because of its high polishing activity.

Calcination is by far the most common method of producing abrasive particles for use in CMP slurries. During the calcination process, precursors such as carbonates, oxalates, nitrates, and sulphates, are converted into their corresponding oxides. After the calcination process is complete, the resulting oxides must be milled to obtain particle sizes and distributions that are sufficiently small to prevent scratching.

The calcination process, although widely used, does present certain disadvantages. For example, it tends to be energy intensive and thus relatively expensive. Toxic and/or corrosive gaseous byproducts can be produced during calcination. In addition, it is very difficult to avoid the introduction of contaminants during the calcination and subsequent milling processes. Finally, it is difficult to obtain a narrow distribution of appropriately sized abrasive particles.

It is well known that CMP slurries containing contaminants and/or over-sized abrasive particles can result in undesirable surface scratching during polishing. While this is less critical for coarse polishing processes, in the production of critical optical surfaces, semiconductor wafers, and integrated circuits, defect-free surfaces are required. This is achievable only when the abrasive particles are kept below about 1.0 $\mu m$ in diameter and the CMP slurry is free of contaminants. The production of abrasive particles meeting these requirements by conventional calcination and milling techniques is extremely difficult and often not economically feasible.

An alternative method of forming abrasive particles for use in CMP slurries is hydrothermal synthesis, which is also known as hydrothermal treatment. In this process, basic aqueous solutions of metal salts are held at elevated temperatures and pressures for varying periods of time to produce small particles of solid oxide suspended in solution. A method of producing ceric oxide ($CeO_2$) particles via hydrothermal treatment is disclosed, for example, in Wang, U.S. Pat. No. 5,389,352.

The production of abrasive particles by hydrothermal treatment provides several advantages over the calcination/milling process. Unfortunately, however, abrasive particles formed by conventional hydrothermal treatment processes tend not to provide desired high polishing rates.

SUMMARY OF INVENTION

The present invention provides a process for producing abrasive particles suitable for use in chemical-mechanical polishing slurries. The process according to the invention comprises mixing a crystallization promoter such as titanium (IV) isopropoxide with a cerium compound and a solvent, optionally adjusting the pH to greater than 7.0 using one or more bases, and subjecting the mixture to hydrothermal treatment at a temperature of from about 60° C. to about 700° C. to produce particles. Although the precise mechanism is not yet precisely understood, the presence of a crystallization promoter in the solution during hydrothermal treatment results in the formation of particles with larger than expected crystallite sizes. Particles formed in this manner polish surfaces at a much higher rate than particles formed by conventional hydrothermal processes.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Figure 1:
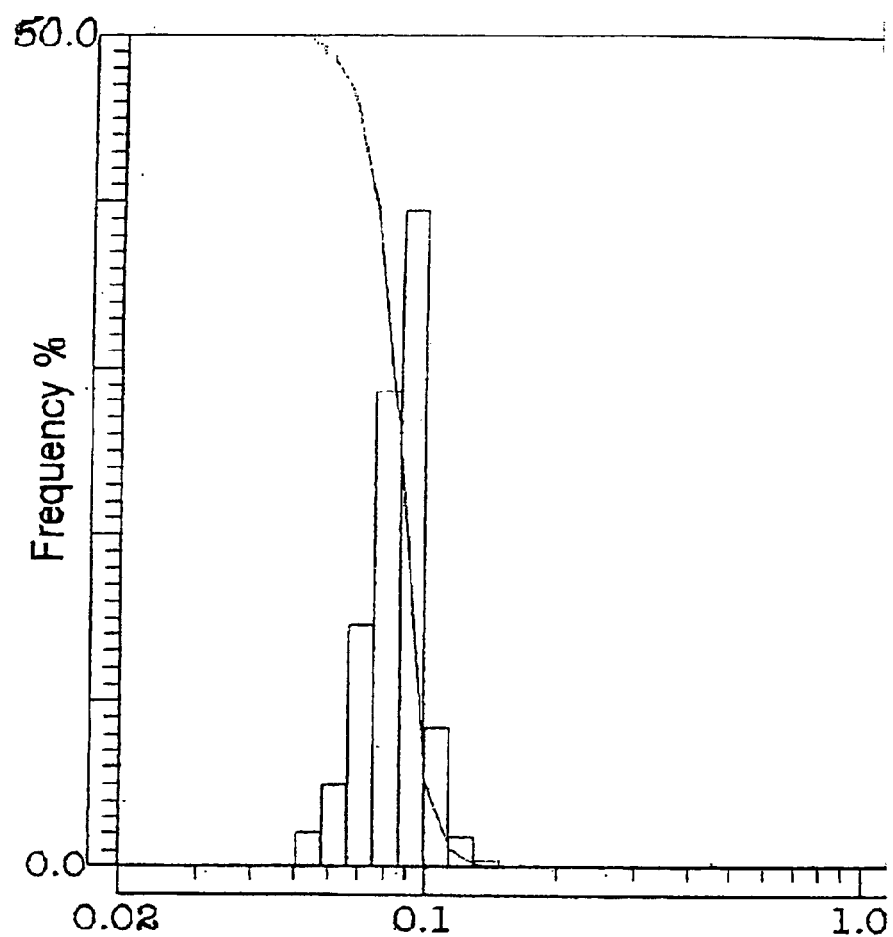
FIG. 1 is a graph showing the particle size distribution of particles formed in Example 1.

The present invention provides a process for producing abrasive particles suitable for use in chemical-mechanical polishing slurries without the need for calcination and/or milling. The process comprises mixing a crystallization promoter with a cerium compound and a solvent, optionally adjusting the pH to higher than 7.0 using one or more bases, and subjecting the mixture to hydrothermal treatment at a temperature of from about 60° C. to about 700° C. to produce particles.

The preferred cerium compound for use in the method according to the invention is $(NH_4)_2Ce(NO_3)_6$ (ammonium cerium (IV) nitrate). However, it will be appreciated that other cerium compounds can also be used. The valence of the cerium in the cerium compound is not per se critical, but ceric (IV) compounds are preferred over cerous (III) compounds. Suitable cerium compounds for use in the invention include, for example, cerium nitrate, cerium chloride, cerium sulfate, cerium bromide, and cerium iodide.

The mixture must also comprise one or more crystallization promoters. The presently most preferred crystallization promoter is a titanium compound, namely $Ti[OCH(CH_3)_2]_4$ (titanium (IV) isopropoxide), but other titanium compounds can be also used, such as, for example, titanium chloride, titanium sulfate, titanium bromide, and titanium oxychloride. Compounds of metals other than titanium can also be used as crystallization promoters, as can non-metallic compounds such as nitrogenous cyclic polymers, poly glycols, alcohols, and ketones. In some cases, the crystallization promoter can also serve as the solvent. Use of a crystallization promoter is essential in order to obtain particles having a relatively large crystallite size.

As noted above, it is possible to use compounds of metals other than titanium such as alkaline earth metals (group IIA of the periodic table), transition metals (element 21, scandium, through element 29, copper; element 39, yttrium, through element 47, silver; element 57, lanthanum, through element 79, gold; and element 89, actinium, and higher), aluminum, zinc, gallium, germanium, cadmium, indium, tin, antimony, mercury, thallium, lead, bismuth, and polonium. Scandium compounds, in particular, can be used to produce cerium oxide ($CeO_2$) particles according to the process of the invention that have relatively large crystallite sizes. However, for reasons that are presently unknown, particles formed using scandium compounds as crystallization promoters are not as effective as abrasives in CMP polishing applications as compared to particles formed using titanium compounds as crystallization promoters.

One or more bases can be optionally added to raise the pH of the mixture to greater than 7.0 and assist in the formation of a mixture having a gel-like consistency. Suitable bases include, for example, ammonium hydroxide, potassium hydroxide, organoamines such as ethyl amine and ethanol amine, and/or polyorganoamines such as polyethylene imine. The gel-like mixture formed upon adding a base will break down into small particles upon rapid stirring.

Other compounds such as urea, for example, can be used as precursors for a base. Urea does not act as a base until it is heated, so it does not tend to form a gel-like mixture when added, but rather will form a clear solution. Moreover, when urea is used, the pH of the mixture will generally not be greater than 7.0.

The mixture, whether in the form of a gel or a clear solution, is then subjected to hydrothermal treatment. This is typically accomplished by heating the mixture in a sealed stainless steel vessel to a temperature of from about 60° C. to about 700° C. for a period of time of from about 10 minutes to many hours. At the completion of the reaction, the stainless steel vessel can be quenched in cold water, or it can be permitted to cool gradually over time. The mixture can be, but need not be, stirred during hydrothermal treatment. It is also possible to carry out the reaction in an autoclave unit with constant stirring.

Testing has shown that the average particle size (diameter) of the particles formed during the hydrothermal treatment can be controlled by varying the initial concentration of the cerium compound, with higher initial cerium ion concentrations tending to produce particles having a larger average particle size. The use of precursors of bases such as urea tends to produce smaller particles. Reaction time, temperature, and pH appear to have little or no effect on particle size. A range of particle sizes from about 5 nm to about 10,000 nm can be obtained via the process, but particles having an average diameter within the range of from about 50 nm to about 250 nm are most preferred.

Although the mechanism is not fully known at this time, for some reason the presence of a crystallization promoter such as $Ti[OCH(CH_3)_2)]_4$ (titanium (IV) isopropoxide) is critical in order to produce abrasive particles having a large crystallite size, which can be determined using well-known X-ray diffraction methods. For example, when subjected to identical hydrothermal conditions (i.e., temperature, time, pH, etc.), a solution containing a titanium (IV) isopropoxide crystallization promoter produced particles having an average crystallite size of 210 Å whereas a solution containing no titanium (IV) isopropoxide crystallization promoter produced particles having a an average crystallite size of only 42 Å. For some reason, the presence of a crystallization promoter in the solution accelerates the crystal growth of crystallites during hydrothermal treatment, which is a desirable attribute for abrasive particles used in CMP slurries. Tests have shown that CMP slurries formed using particles having larger crystallite sizes tend to polish surfaces such as tetraethoxyorthosilicate (TEOS) silicon dioxide films at a much higher rate than CMP slurries formed using particles having smaller crystallite sizes.

The abrasive particles formed in accordance with the method of the invention, in addition to exhibiting a crystallite size of greater than about 200 Å, predominantly comprise cerium oxide ($CeO_2$) having a cubic crystal structure. Elemental analysis of abrasive particles formed using a titanium compound as a crystallization promoter show the presence of titanium atoms in the cubic crystal structure. There is no titanium dioxide observed by X-ray diffraction, and no anatase nor rutile crystal structure. It is hypothesized that the titanium atoms are incorporated into the cubic cerium oxide crystal structure, replacing cerium atoms in such structure. This same phenomenon is noted when compounds of metals other than titanium are used as crystallization promoters. When a cystallization promoter selected from the group consisting of nitrogenous cyclic polymers, poly glycols, alcohols, and ketones is used, the cerium oxide particles will exhibit a cubic crystal lattice structure wherein carbon atoms obtained from the crystallization promoter are incorporated into the cubic crystal lattice structure.

It will be appreciated that certain metallic compounds, such as titanium compounds, tend to rapidly decompose in aqueous media, which reduces their efficiency in promoting the formation of particles having larger crystallite sizes. Accordingly, it is preferable for one or more stabilizing compounds such as, for example, acetyl acetone and EDTA, to be present with the crystallization promoters in order to prevent or delay the decomposition of such compounds. When stabilized in this manner, the crystallization promoters have sufficient time to homogeneously mix with the cerium compounds at a molecular level, particularly before a gel-like mixture is formed upon the addition of one or more bases. Applicants have discovered that when the crystallization promoters are stabilized in this manner, the particles formed during hydrothermal treatment tend to have substantially larger crystallite sizes.

The particles formed according to the process of the invention are particularly well suited for use in CMP slurries. CMP slurries can be formed using the particles as obtained via the process or by adding water, acid and/or base to adjust the abrasive concentration and pH to desired levels. Alternatively, the abrasive particles formed according to the invention can be bonded to a polishing pad.

Surfaces that can be polished using abrasive particles according to the invention include, but are not limited to TEOS silicon dioxide, spin-on glass, organosilicates, silicon nitride, silicon oxynitride, silicon, silicon carbide, computer memory hard disk substrates, silicon-containing low-k dielectrics, and silicon-containing ceramics. The abrasive particles according to the invention are particularly useful for polishing layers in semiconductor devices.

The following examples are intended only to illustrate the invention and should not be construed as imposing limitations upon the claims.

EXAMPLE 1

In a 1000 ml plastic bottle, 41.6 grams of $(NH_4)_2Ce(NO_3)_6$ (ammonium cerium (IV) nitrate) was dissolved in 500 ml deionized $H_2O$ (DI-water) and 1.2 grams $CH_3COCH_2OCCH_3$ (acetyl acetone) to form a solution. 2.4 grams of $Ti[OCH(CH_3)_2)]_4$ (titanium (IV) isopropoxide) was added to the solution followed by the addition of 36 grams of $C_2H_5NH_2$ (ethylamine) with stirring. A sufficient quantity of DI-water was then added to reach a final volume of 800 ml. The solution was stirred for 5 minutes and then transferred to a clean 1000 ml stainless steel vessel. The stainless steel vessel was closed and sealed, shaken for 5 minutes, and then placed into a furnace and heated at 300° C. for 6.0 hours. The stainless steel vessel was then removed from the furnace and allowed to cool to room temperature. The reaction product formed in the vessel was transferred to a clean 1000 ml plastic bottle. As shown in FIG. 1, the reaction product consisted of a dispersion of $CeO_2$ (cerium oxide) particles having a narrow size distribution ($D_{50}$=87 nm; $D_{90}$=101 nm; and $D_{10}$=68 nm). The cerium oxide particles had an average crystallite size of 210 Å.

EXAMPLE 2

Comparative Example

A dispersion of cerium oxide particles was formed using the same materials and procedures as set forth in Example 1, except that no $Ti[OCH(CH_3)_2)]_4$ (titanium (IV) isopropoxide) was used. The cerium oxide particles thus formed had a narrow size distribution ($D_{50}$=89 nm; $D_{90}$=99 nm; and $D_{10}$=72 nm) similar to the cerium oxide particles formed in Example 1, but the average crystallite size was only 42 Å.

EXAMPLE 3

A dispersion of cerium oxide particles was formed using the same materials and procedures as set forth in Example 1, except that no acetyl acetone ($CH_3COCH_2OCCH_3$) was used. The cerium oxide particles thus formed had a narrow size distribution ($D_{50}$=80 nm; $D_{90}$=97 nm; and $D_{10}$=60 nm) similar to the cerium oxide particles formed in Example 1, but the average crystallite size was only 90 Å.

EXAMPLE 4

Four chemical-mechanical polishing slurries were formed using cerium oxide particles. Slurry A consisted of 100 parts by weight of the cerium oxide nanoparticle dispersion formed in Example 1. Slurry B was identical to Slurry A, except that the cerium oxide nanoparticle dispersion formed in Example 2 was used instead of the cerium oxide nanoparticle solution formed in Example 1. Slurry C was identical to Slurry A, except that the cerium oxide nanoparticle dispersion formed in Example 3 was used instead of the cerium oxide nanoparticle solution formed in Example 1. Slurry D was identical to Slurry A, except that the cerium oxide nanoparticle dispersion comprised conventional calcined cerium oxide (Ferro Electronic Material Systems SRS-616A) having an average particle size of $D_{50}$=141 nm dispersed in water at a pH of 10.0. Identical TEOS $SiO_2$ (silicon dioxide) wafers were polished using Slurries A, B, C, and D, respectively. The polishing was performed using a Strasbaugh 6EC polisher, a Rodel IC1000 pad with Suba IV backing at a down pressure of 3.2 psi, and a table rotation speed of 60 rpm, and slurry flow rate of 150 ml/min. The wafer polished using Slurry A had a $SiO_2$ removal rate of 3500 Å/min and produced a surface having a root-mean-square average roughness of 0.8 Å. The wafer polished using Slurry B had a $SiO_2$ removal rate of 85 Å/min and produced a surface having a root-mean-square average roughness of 1.0 Å. The wafer polished using Slurry C had a $SiO_2$ removal rate of 1875 Å/min and produced a surface having a root-mean-square average roughness of 2.0 Å. And, the wafer polished using Slurry D had a $SiO_2$ removal rate of 4200 Å/min and produced a surface having a root-mean-square average roughness of 3.0 Å.

EXAMPLE 5

32.34 grams of ammonium cerium (IV) nitrate was dissolved in 50 ml DI-water in a 100 ml beaker and heated to 90° C. under stirring to form an aqueous solution. Another solution containing 0.02 grams polyvinyl pyrrolidone (PVP) having a weight average molecular weight of about 29,000 admixed in 380 grams of 6M KOH in a 500 ml beaker was heated to 90° C. The aqueous cerium solution was then added to the KOH solution under constant stirring for 30 minutes. The temperature was kept at 90° C. A white precipitate was filtered off and washed with water until the pH of the filtrate was below 10. The precipitate was then dispersed in DI-water to make a total volume of 100 ml, ultrasonicated for 5 minutes and transferred into a 150 ml steel vessel and sealed. The steel vessel was then placed in a pre-heated oven at 250° C. for 6 h for hydrothermal treatment. At the end of the hydrothermal treatment, the vessel was quenched in cold water to room temperature and the slurry was removed. The so-obtained cerium oxide particles had an average particle diameter $D_{50}$ of 300 nm and an average crystallite size of 130 Å.

EXAMPLE 6

The same process as described in Example 5 was repeated except that PVP was replaced with 0.02 gram of polyethylene glycol having a weight average molecular weight of about 600. The so-obtained cerium oxide particles had an average particle diameter $D_{50}$ of 100 nm and an average crystallite size of 150 Å.

EXAMPLE 7

50 grams of ammonium cerium (IV) nitrate was dissolved in 50 ml DI-water in a 100 ml beaker and heated to 90° C. under stirring to form an aqueous cerium solution. Another solution comprising a mixture of 139.32 grams KOH, 234.09 grams DI-water, 21.465 grams methanol, and 10.125 grams acetone was heated to 90° C. in a 500 ml beaker. The aqueous cerium solution was then added to the KOH solution under constant stirring for 30 minutes. The temperature was kept at 90° C. A white precipitate was filtered off and washed with water until the pH of the filtrate was below 10. The precipitate was then dispersed in water to make a total volume of 100 ml, ultrasonicated for 5 minutes and transferred into a 150 ml steel vessel and sealed. The steel vessel was then placed in a pre-heated oven at 250° C. for 6 hours for hydrothermal treatment. At the end of the hydrothermal treatment, the vessel was quenched in cold water to room temperature and the slurry was removed. The so-obtained cerium oxide particles had an average particle diameter $D_{50}$ of 110 nm and an average crystallite size of 130 Å.

EXAMPLE 8

22.3 grams of ammonium cerium (IV) nitrate was dissolved in 40 ml DI-water in a 100 ml beaker. Then, 2.59 grams of a mixture solution containing 1.177 grams of acetyl acetone and 1.413 grams of titanium (IV) isopropoxide was added into the ammonium cerium (IV) nitrate solution under stirring. In another beaker, 20.7 grams of concentrated ammonium hydroxide (57 wt % $NH_4OH$) was mixed with 20 grams of DI-water. The solution containing ammonium cerium (IV) nitrate and titanium (IV) isopropoxide was then added into the ammonium hydroxide solution under stirring, stirred for another 3 minutes, and additional DI-water added to a total final volume of 100 ml. The mixture was ultrasonicated for 5 minutes, transferred to a 150 ml steel vessel, and tightly sealed. The steel vessel was then placed in an oven preheated at 300° C. for 6 hours for hydrothermal treatment. At the end of the hydrothermal treatment, the vessel was quenched in cold water to room temperature and the slurry was removed. The so-obtained cerium oxide particles had an average particle diameter $D_{50}$ of 97 nm and an average crystallite size of 260 Å.

EXAMPLE 9

71.6 grams of ammonium cerium (IV) nitrate and 35.1 grams of urea were dissolved in 700 ml DI-water in a 1000 ml beaker. Then, 7.52 grams of a mixture solution containing 3.418 grams of acetyl acetone and 4.102 grams of titanium (IV) isopropoxide was added into the ammonium cerium (IV) nitrate solution under stirring. Additional DI-water was added to mixture to a total final volume of 1286 ml. Finally, the mixture was transferred to a 2000 ml steel vessel and tightly sealed. The sealed steel vessel was then placed in an oven preheated at 300° C. for 3 hours for hydrothermal treatment. At the end of the hydrothermal treatment, the vessel was quenched in cold water to room temperature and the slurry was removed. The so-obtained cerium oxide particles had an average diameter $D_{50}$ of 860 nm and an average crystallite size of 2480 Å.

EXAMPLE 10

The process as described in Example 9 was repeated except that ammonium cerium (IV) nitrate was replaced with 56.4 grams of $Ce(NO_3)_3$ (cerium (III) nitrate). The so-obtained cerium oxide particles had an average diameter $D_{50}$ of 910 nm and an average crystallite size of 2220 Å.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A process for producing abrasive particles comprising mixing a crystallization promoter with a cerium compound and a solvent to form a mixture, and subjecting the mixture to hydrothermal treatment at a temperature of from about 60° C. to about 700° C. to produce the abrasive particles.

2. The process according to claim 1 wherein the mixture further comprises urea and/or at least one pH adjuster selected from the group consisting of organic acids, organic bases, inorganic acids and inorganic bases.

3. The process according to claim 1 wherein the cerium compound is ammonium cerium (IV) nitrate.

4. The process according to claim 1 wherein the crystallization promoter is one or more selected from the group consisting of compounds of alkaline earth metals, transition metals, aluminum, zinc, gallium, germanium, cadmium, indium, tin, antimony, mercury, thallium, lead, bismuth, and polonium.

5. The process according to claim 4 wherein the crystallization promoter comprises a titanium compound.

6. The process according to claim 5 wherein the titanium compound is selected from the group consisting of titanium (IV) isopropoxide, titanium chloride, titanium sulfate, titanium bromide, and titanium oxychloride.

7. The process according to claim 5 wherein the titanium compound is titanium (IV) isopropoxide.

8. The process according to claim 5 wherein the titanium compound is titanium oxychloride.

9. The process according to claim 1 wherein the crystallization promoter is selected from the group consisting of nitrogenous cyclic polymers, poly glycols, alcohols, and ketones.

10. The process according to claim 9 wherein the nitrogenous cyclic polymer is polyvinyl pyrrolidone.

11. The process according to claim 9 wherein the poly glycol is selected from polyethylene glycol and polypropylene glycol.

12. The process according to claim 9 wherein the alcohol is methanol.

13. The process according to claim 9 wherein the ketone is acetone.

14. The process according to claim 1 wherein the solvent is one or more selected from the group consisting of water, alcohols, glycols, and ketones.

15. The process according to claim 14 wherein the alcohol is one or more selected from the group consisting of ethanol, isopropanol, butanol and butanediol.

16. The process according to claim 14 wherein the glycol is selected from ethylene glycol and propylene glycol.

17. The process according to claim 14 wherein the ketone is acetone.

18. The process according to claim 1 wherein the mixture further comprises at least one compound that delays the decomposition of the crystallization promoter.

19. The process according to claim 18 wherein the compound that delays the decomposition of the crystallization promoter is one or more selected from the group consisting of acetyl acetone and EDTA.

20. The process according to claim 18 wherein the compound that delays the decomposition of the crystallization promoter comprises acetyl acetone.

21. Abrasive particles formed in accordance with the process of claim 1.

22. Abrasive particles comprising crystallites of cerium oxide that have a cubic crystal lattice structure and an average crystallite size of greater than about 60 Å, wherein atoms of one or more metals selected from the group consisting of alkaline earth metals, transition metals, aluminum, zinc, gallium, germanium, cadmium, indium, tin, antimony, mercury, thallium, lead, bismuth, and polonium are incorporated into the cubic crystal lattice structure of said crystallites, and wherein said abrasive particles have an average particle size ($D_{50}$) within the range of from about 5 nm to about 10,000 nm and have not been calcined.

23. Abrasive particles according to claim 22 wherein the particles have an average particle size ($D_{50}$) within the range of from about 50 nm to about 250 nm and an average crystallite size of greater than about 200 Å.

24. A method of polishing a silicon-containing surface comprising abrading the surface with abrasive particles according to claim 22.

25. The method according to claim 24 wherein the silicon-containing surface is selected from the group consisting of TEOS silicon dioxide, spin-on glass, organosilicates, silicon nitride, silicon oxynitride, silicon, silicon carbide, computer memory hard disk substrates, silicon-containing low-k dielectrics, and silicon-containing ceramics.

26. The method according to claim 24 wherein the abrasive particles are bonded to a polishing pad and/or dispersed in a chemical-mechanical polishing slurry.

27. A semiconductor device comprising a layer polished using abrasive particles according to claim 22.

* * * * *